June 2, 1964 A. H. ASHLEY 3,135,948

ELECTRONIC MEMORY DRIVING

Filed Aug. 28, 1961 3 Sheets-Sheet 1

INVENTOR.
ALBERT H. ASHLEY
BY F. I. Sullivan
ATTORNEY

June 2, 1964 A. H. ASHLEY 3,135,948

ELECTRONIC MEMORY DRIVING

Filed Aug. 28, 1961 3 Sheets-Sheet 2

INVENTOR.
ALBERT H. ASHLEY
BY F. J. Sullivan
ATTORNEY

INVENTOR.
ALBERT H. ASHLEY
BY F. I. Sullivan
ATTORNEY

United States Patent Office 3,135,948

Patented June 2, 1964

3,135,948

ELECTRONIC MEMORY DRIVING

Albert H. Ashley, Holliston, Mass., assignor to Sylvania Electric Products Inc., a corporation of Delaware Filed Aug. 28, 1961, Ser. No. 134,490

10 Claims. (Cl. 340—174)

This invention is concerned with electronic data processing equipment, and particularly with improvements in memory devices and associated drive circuitry useful in such equipment.

In digital computers and other electronic data processing equipment, the data to be processed is organized into a suitable operating program and processed, through an input device such as a magnetic tape, punch card system, etc., into a working memory apparatus where it is available for further processing or entry into an arithmetic or logical calculation. The capacity of the memory and the speed with which information can be stored within and derived from it are thus controlling limitations on equipment performance.

A coincident current memory is a random access working memory device which allows information to be written into, derived from, or altered within any part of the memory at any time. In a conventional configuration, it utilizes a matrix of magnetic cores supported by cross grids of wires to which pulses of electric current are applied. The individual cores located at the intersection of cross wires are activated when current flows in both wires at the intersection. Hence, the term coincident current characterizes the memory operation.

The use of ferrite cores as storage elements has accomplished a large scale reduction in memory size. Further size reduction has been hindered, however, by the size and number of components necessary in the memory drive circuitry. A pulse transformer matrix described in co-pending U.S. patent application Serial No. 679,967, now Pat. No. 3,058,096, which is also assigned to Sylvania Electric Products Inc., greatly reduces the size of memory drive subsystems, but it requires the use of transformers which are comparatively large, and also relatively slow in operation, to achieve direct driving of bipolar, i.e. read and write, current pulses.

Present state-of-the-art coincident current memories require two X windings, two Y windings, one Z winding, and one sense winding per core. As core size decreases, the core itself becomes crowded by so many wires. Thus, a considerable advantage may be obtained by requiring only one X winding and one Y winding with a bipolar capability to accomplish both read and write operations.

Accordingly, a principal object of the present invention is to provide an improved memory, and specifically a more satisfactory drive useful in coincident current magnetic core memories and one which will decrease size and simplify direct driving with bipolar pulses.

These and related objects are accomplished in one embodiment of the invention by a matrix arrangement of transistor switches and diodes which requires the use of only one X winding and one Y winding to accomplish both read and write operations.

Other objects and applications of the invention will be apparent from the following description of a preferred embodiment and reference to the accompanying drawings, wherein:

FIG. 1 depicts the invention in block diagram form for an illustrative 4 x 4 matrix of sixteen drive lines.

Only one coordinate system is shown (either X or Y) since the circuitry is identical for each. Assuming the Y coordinate, blocks 81–96 represent sixteen rows of cores. Each block contains one Y winding per core. A first pair of diodes 17–48 is connected in parallel to one end of the winding line and a second pair 49–80 is connected to the other end. Each such set of four diodes replaces one transformer of previous systems for achieving direct driving of bipolar pulses. In this 4 x 4 matrix driving sixteen lines in two directions, blocks 1–8 represent four current sources on either side of the sixteen lines and blocks 9–16 represent switches for connecting these sources to ground to promote current flow through the lines.

Figure 1:
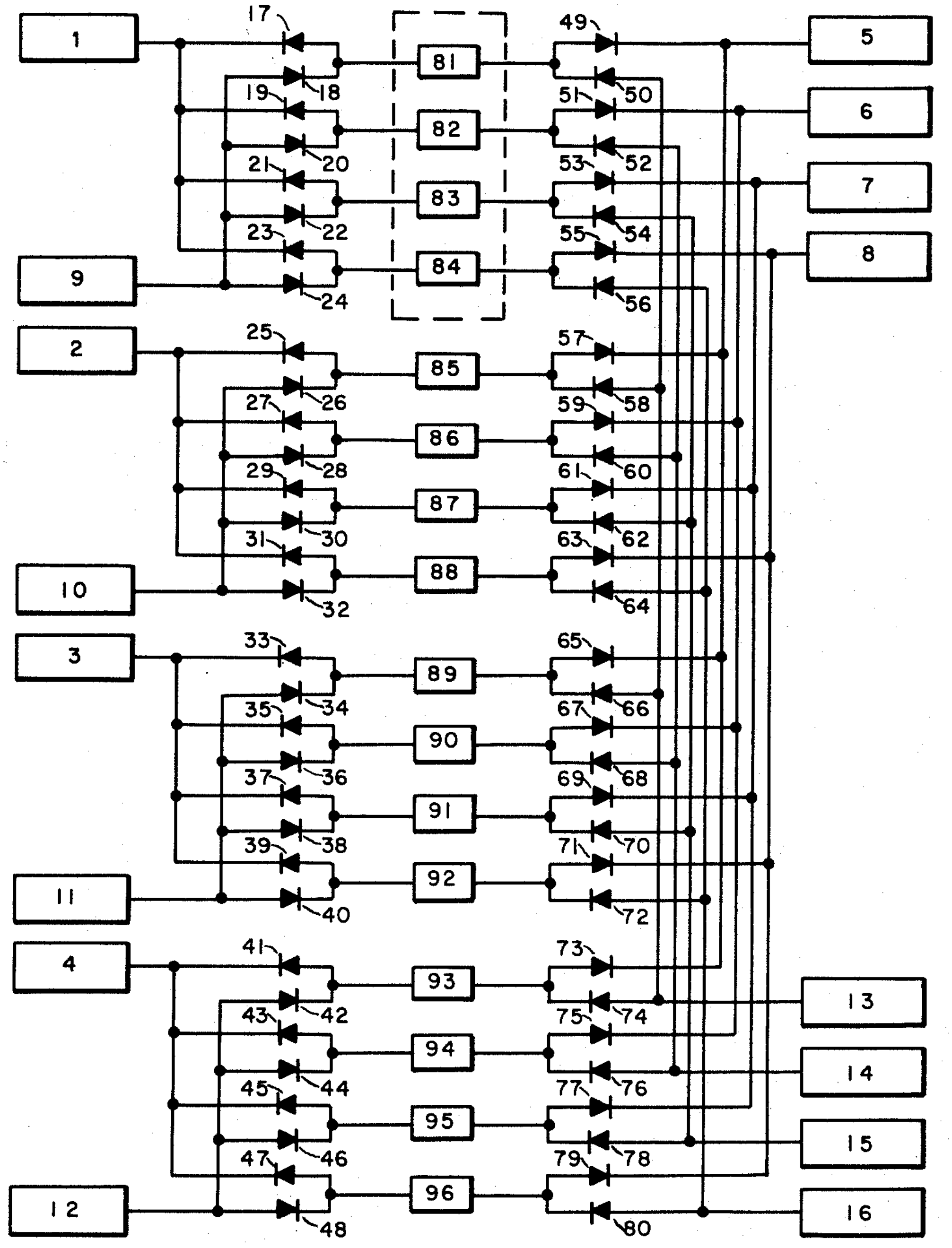
FIG. 1 is a block diagram representation of a single coordinate drive.
Figure 2:
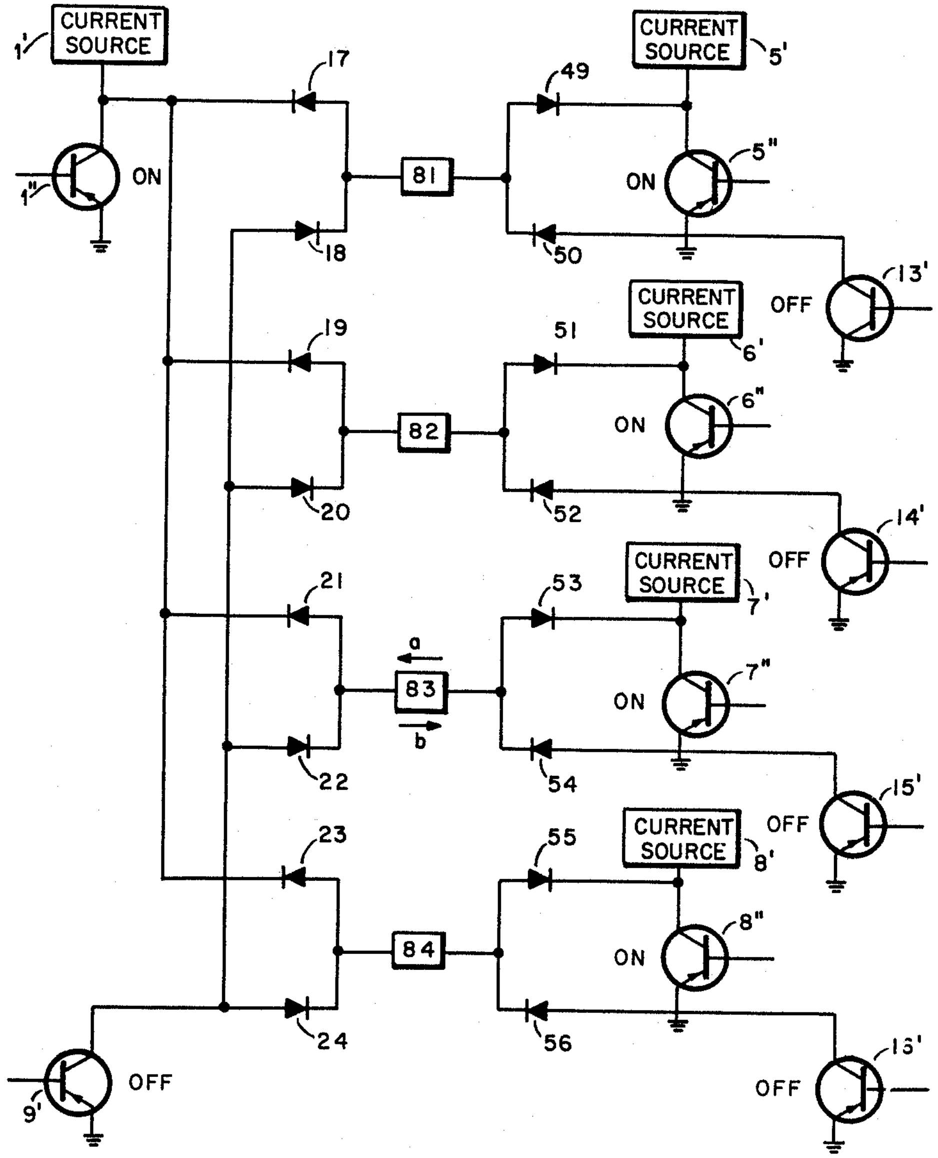
FIG. 2 is a diagrammatic representation, in more detail, of a portion of the diagram of FIG. 1.

FIG. 2 represents one means of implementing the circuitry necessary to drive the cores in blocks 81–84. Blocks 1, 5, 6, 7, and 8 are replaced by quiescently "on" transistor switches having current sources in their collectors. Blocks 9, 13, 14, 15, and 16 are replaced by "off" transistor switches with grounded emitters. These transistors and current sources are referenced with the numerals of the blocks of FIG. 1 to which they pertain and suitable prime (′) designations. It should be noted that FIG. 2 does not represent an integral 2 x 2 matrix to drive four lines but part of the 4 x 4 matrix of FIG. 1 driving four of its sixteen lines.

Row 83 may be selected as an example of the manner in which cores are read from and written into. At zero time all transistors are in the respective quiescent conditions indicated in FIG. 2. For the read operation, transistor 15′ is turned "on" first, but no collector current flows until diode 54 becomes forward biased which it cannot do until its cathode drops below a certain value. This is approximately −0.5 volt in practice. Transistor 1″ is next turned "off" so that current from source 1′ must find a new path from ground. The only path of low impedance is through "on" transistor 15′, diode 54, cores 93, diode 21, and current source 1′. This overcomes the bias on diode 54 and provides read current in direction "*a*" through cores 83. Switches 15′ and 1″ are returned to their quiescent conditions after an amount of time, equal to the normal switching time of the cores, has elapsed.

At the end of a dead time, the write operation begins. Transistor 9′ is turned "on" but no collector current flows in direction "*b*" until transistor 7″ is turned "off" so that write current flows through "on" transistor 9′, diode 22, cores 83, diode 53, and current source 7′. Thus, by proper selection of switches, cores may be read from and written into while requiring only one X and one Y winding. Read current may be assumed to flow in direction "*a*" from right to left through the cores and write current from left to right in direction "*b*." Consequently, transistor switches 1″, 13′, 14′, 15′, and 16′ may be called read switches and switches 9′, 5″, 6″, 7″, and 8″, write switches.

Figure 3:
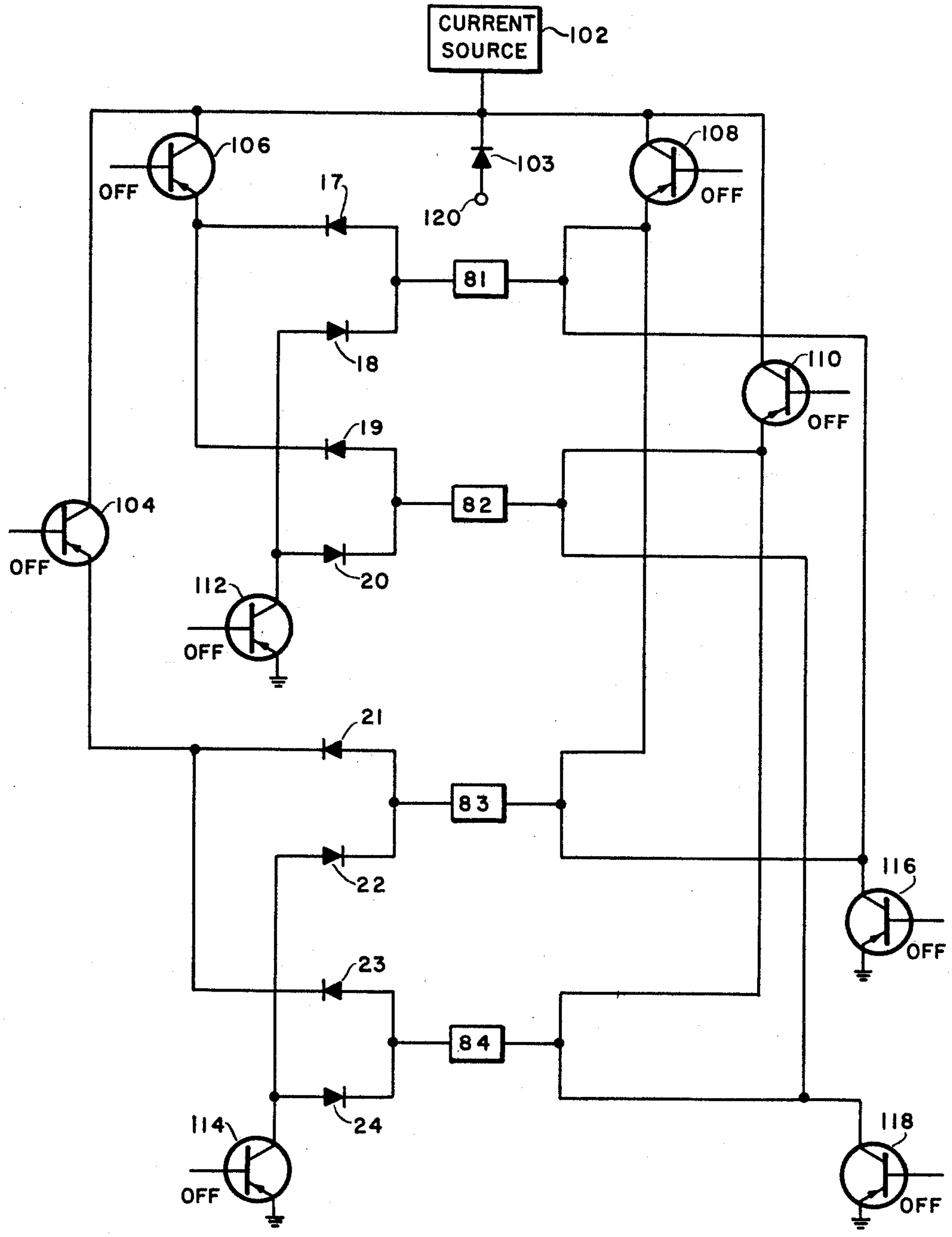
FIG. 3 is a diagrammatic representation of a further refinement of the invention.

A modification of the invention is shown in FIG. 3. Here, a single source 102 provides current for the entire matrix, and transistor switches are employed to establish a circuit connection from this source, through the desired line and in the desired direction, to a grounded reference potential. The matrix is shown in a 2 x 2 configuration for selectively energizing the four lines 81–84 in either direction, but it may be readily expanded to the 16 x 16 matrix of FIG. 1 or other desired configurations. In addition to the single current source, this modification utilizes a diode clamp 103 as a substitute for the current shunting transistors 5″–8″ of FIG. 2 and the switching transistors are arranged to assist in isolation of current sneak paths so that one half of the diodes required for the matrix of FIGS. 1 and 2 are eliminated.

Referring to FIG. 3, current from source 102 is provided to the lines 81–84 through transistors 104–110 and connection from these lines to complete the current circuits to ground is established by transistors 112–118.

The matrix operates in the following manner to provide bipolar read and write current pulses through any selected line, e.g. line 83.

Assume that the matrix is in its quiescent state as shown in FIG. 3 with all transistors off and current flowing from terminal 120 through diode clamp 103 to source 102. No current is flowing through any of the lines 81–84. A write pulse is transmitted by energizing transistors 114 and 108 to conductive condition. This reduces the potential drop across clamp 103 rendering it non-conductive and causing current to flow in direction "*b*" from ground through line 83 to source 102. The "off" condition of transistor 110 prevents current from "sneaking" through line 84 which would otherwise provide a conductive path from "on" transistor 114 through diode 24. Other sneak paths through line 84 are prevented by isolating diode 23. A read pulse is provided by turning transistors 116 and 104 on. This provides a current path from ground through transistor 116, line 83 (in direction "*a*"), diode 21 and transistor 104 to source 102. A suitable manner of operating these transistor switches is described in co-pending U.S. patent application Serial No. 107,418, filed May 3, 1961 and also assigned to Sylvania Electric Products Inc.

Although the invention has been described as applied, in a preferred embodiment, to a coincident current magnetic core memory device, this is by way of illustration and not limitation. It may be used with other types of storage devices and for other related purposes. Its scope is limited only by the following claims.

What is claimed is:

1. For a magnetic memory system, a circuit arrangement including a coordinate row of bistable magnetic memory devices, a conductor having first and second end terminals and linking said devices, each of said end terminals being connected to a circuit matrix and each of said matrices including: first and second grounded emitter transistor current switches; a current source; first and second diodes each having an anode and a cathode; means connecting said current source in common to the collector of said first transistor and to the cathode of said first diode; means connecting the collector of said second transistor to the anode of said second diode; and, means connecting the end terminal of said conductor to the anode of said first diode and the cathode of said second diode.

2. For a magnetic memory system, a circuit arrangement including a coordinate row of bistable magnetic memory devices, a conductor having first and second ends and linking said devices, each end of said conductor being connected to a circuit matrix, each of said matrices including: first, second, and third transistor current switches; a diode having anode and cathode; a current source; means connecting said current source in common to the collector of said third transistor and to the collector of said first transistor; means connecting the emitter of said third transistor to a point of ground potential; means connecting the emitter of said first transistor to the cathode of said diode; and, means connecting the collector of said second transitsor in common to the anode of said diode and to the end of said conductor; and means connecting the emitter of said second transistor to a point of ground potential.

3. A magnetic memory drive system having a single matrix for reading and for writing, said matrix comprising at least one current source connected in circuit with two sets of transistors and two diodes, said system being operative in response to pulsing of one set of transistors to read and operative in response to pulsing of the other set of transistors to write.

4. An electronic memory system comprising: a plurality of separate groups of at least one substantially square hysteresis loop magnetic element; a plurality of electric current conductors; a separate one of said conductors corresponding to each separate one of said groups and linking the magnetic elements of its respective group, a current source; a plurality of first transistors each having emitter, collector and base electrodes; a first plurality of unidirectional current conducting devices, each having an input terminal and an output terminal and each having its input terminal connected to one end of a corresponding separate one of said conductors; means connecting the emitter-collector junction of a separate one of said transistors between the output terminal of a corresponding separate one of said unidirectional devices and said current source; a plurality of second transistors, each having emitter, collector and base electrodes; a source of current reference potential; means connecting the emitter-collector junction of each one of said second transistors between said one end of a corresponding separate one of said conductors and said current reference; a third transistor having emitter, collector and base electrodes; means connecting the emitter-collector junction of said third transistor between said current source and said current reference in shunt relationship across said separate first transistor-unidirectional conductor-second transistor circuits; fourth and fifth transistors, each having emitter, collector and base electrodes; a second plurality of unidirectional current conducting devices each having an input terminal and an output terminal; means connecting the input terminal of each separate one of said second plurality of unidirectional conducting devices to the end of a separate one of said conductors opposite to that end to which one of said first plurality of unidirectional conducting devices is connected; means connecting the output terminal of all of said second plurality of devices in common to one end of the emitter-collector junction of said fourth transistor; means connecting the other end of said junction to said current source; and, means connecting the emitter-collector junction of said fifth transistor, in common, between said opposite ends of said conductors and said current reference.

5. For a magnetic memory system, a common matrix for providing read and write current signals comprising: a plurality of groups of at least one magnetic element; a plurality of electric current conductors, each corresponding to and linking a separate one of said groups; a source of read current; means connecting said source of read current to one end of each of said conductors; a source of write current; means connecting said source of write current to the opposite end of each of said conductors; a plurality of points of reference potential; means for coupling read current from said source of read current, in one direction, through any selected one of said conductors to one of said points of reference potential; means for coupling write current from said source of write current, in the opposite direction, through any selected one of said conductors to one of said points of reference potential; means for providing a shunt current path from said read and write current sources to one of said points of reference potential when said sources are not delivering current through said conductors; and, means connected to said conductors and operative to prevent current flow through other ones of said conductors when current is caused to flow through a selected conductor.

6. The invention according to claim 5 wherein said last-mentioned means includes a plurality of semiconductive diodes connected to either end of said conductors.

7. The invention according to claim 5 wherein said last-mentioned means includes a plurality of semiconductive diodes connected to one end of said conductors and the collector-emitter junctions of a plurality of transistors connected to the other end of said conductors.

8. For a magnetic memory system, a bipolar current driving matrix comprising: a plurality of groups of at least one substantially square hysteresis loop magnetic element; a plurality of electric current conductors, one corresponding to each of said groups and linking the elements thereof; a current source; at least one point of reference for current flow; said conductors being arranged in at least two groups of at least two conductors each; means for causing read current to flow in one direction through any selected one only of said conductors; means for causing write current to flow in the opposite direction through any selected one only of said conductors; each of said means including a first matrix arrangement of transistor switches connected between said current source and one end of said conductors, a second matrix arrangement of transistor switches connected between said current source and the other ends of said conductors, a third matrix arrangement of transistors connected between said one end of said conductors and a point of current reference, and a fourth matrix arrangement of transistors connected between said other ends of said conductors and a point of current reference; a plurality of unidirectional current conducting devices connected between said first and third matrix arrangements and their respective conductors to prevent sneak current paths; direct connections between said other ends of said conductors and the emitter-collector junctions of the transistors of said second and fourth matrices to prevent sneak current paths; a common connection for the transistors of said first and second matrix arrangements; and, a diode clamp connected between said common connection and a point of current reference, said clamp being biased for current flow when current is not flowing through said conductors and for cut-off of said current flow when current is flowing through one of said conductors.

9. For a magnetic memory system, a circuit arrangement including a coordinate row of bi-stable magnetic memory devices, a conductor having first and second end terminals and linking said devices, each of said end terminals being connected to a circuit matrix and each of said matrices including: a current source; a first current switch connected between said source and a source of reference potential; a second current switch having first and second terminals, the first of which is connected to said source of reference potential; first and second diodes each having an anode and a cathode; means connecting said first diode between said first switch and an end terminal of said conductor with the anode thereof connected to said one end terminal; and means connecting said second diode between the second terminal of said second switch and said one end terminal of said conductor with the cathode thereof connected to said one end terminal.

10. For a magnetic memory system, a common matrix for providing read and write current signals comprising: a plurality of groups of at least one magnetic element; a plurality of current conductors, each corresponding to and linking a separate one of said groups of magnetic elements; a common source of read and write current; a first transistor switch connected to said current source and operative when conducting to derive read current therefrom; a second transistor switch connected to said current source and operative when conducting to derive write current therefrom; a plurality of points of reference potential; means connecting said first transistor switch to one end of each of said conductors; means connected between the other end of each of said conductors and one of said points of reference potential for conducting read current in one direction through any selected one of said conductors; means connecting said second transistor switch to the said other end of each of said conductors; means connected between the said one end of each of said conductors and one of said points of reference potential for conducting write current in the opposite direction through any selected one of said conductors; means including a diode clamp connected between said current source and a reference point of current flow for providing a shunt current path when said first and second transistors are non-conducting; and means connected to said conductors and operative to prevent current flow through other ones of said conductors when current is caused to flow through a selected conductor, said last-mentioned means including a plurality of diodes connected to said other end of each of said conductors and the collector-emitter junctions of a plurality of transistors connected to said one end of said conductors.

References Cited in the file of this patent

UNITED STATES PATENTS 3,056,948 Lee ____________________ Oct. 2, 1962